(12) United States Patent
Manewald et al.

(10) Patent No.: US 12,703,456 B2
(45) Date of Patent: Aug. 11, 2026

(54) METHOD FOR OPERATING A DRIVE UNIT OF AN ELECTRIC BICYCLE

(71) Applicant: Robert Bosch GmbH, Stuttgart (DE)

(72) Inventors: Merlin Martin Manewald, Reutlingen (DE); Christian Reisige, Tuebingen (DE); Sebastian Eberle, Tuebingen (DE); Joseph Reck, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 715 days.

(21) Appl. No.: 18/186,735

(22) Filed: Mar. 20, 2023

(65) Prior Publication Data

US 2023/0303208 A1 Sep. 28, 2023

(30) Foreign Application Priority Data

Mar. 25, 2022 (DE) ..................... 10 2022 202 979.8

(51) Int. Cl.
*B62M 6/55* (2010.01)
*B62M 6/45* (2010.01)
*B62M 6/50* (2010.01)

(52) U.S. Cl.
CPC ................ *B62M 6/55* (2013.01); *B62M 6/50* (2013.01)

(58) Field of Classification Search
CPC ............. B62M 6/55; B62M 6/50; B62M 6/45
See application file for complete search history.

(56) References Cited

U.S. PATENT DOCUMENTS 10,479,442 B2 11/2019 Baumgaertner
11,008,063 B2 5/2021 Moening et al.
2014/0365013 A1 12/2014 Kruse
2019/0308512 A1* 10/2019 Hasumi .................... B62M 6/45
2020/0010145 A1 1/2020 Lisanti et al.
2020/0324856 A1* 10/2020 Kim ......................... B62J 43/10

FOREIGN PATENT DOCUMENTS

DE 10 2009 029 655 A1 3/2011
DE 10 2013 201 101 A1 7/2014
EP 2860096 A1 * 4/2015
WO 2019/102495 A1 5/2019

OTHER PUBLICATIONS

Hsu et al., "A Reinforcement-Learning-Based Assisted Power Management With QoR Provisioning for Human-Electric Hybrid Bicycle", IEEE Transactions on Industrial Electronics, Aug. 2012, pp. 3350-3359, vol. 59, No. 8 (10 pages).
Fukushima et al., "Experimental Verification of Torque Sensorless Control for Electric Power-Assisted Bicycles on Sloped Environment", IEEE 15th International Workshop on Advanced Motion Control (AMC), 2018, pp. 66-71 (6 pages).

* cited by examiner

*Primary Examiner* — Brian P Sweeney
(74) *Attorney, Agent, or Firm* — Maginot, Moore & Beck LLP

(57) ABSTRACT

A method for operating a drive unit of an electric bicycle is disclosed. The method includes determining a temporary actual torque curve of a driver torque generated by a muscle force of a driver of the electric bicycle. The method further includes estimating a future torque curve by extrapolating the determined actual torque curve. In addition, the method includes determining whether the estimated future torque curve falls below a predetermined first torque threshold within a predetermined first time frame. The method also includes controlled reduction of a motor torque generated by way of the drive unit when the estimated future torque curve within the first time frame falls below the first torque threshold.

19 Claims, 4 Drawing Sheets

METHOD FOR OPERATING A DRIVE UNIT OF AN ELECTRIC BICYCLE

This application claims priority under 35 U.S.C. § 119 to patent application no. DE 10 2022 202 979.8, filed on Mar. 25, 2022 in Germany, the disclosure of which is incorporated herein by reference in its entirety.

BACKGROUND

The present disclosure relates to a method for operating a drive unit of an electric bicycle as well as to an electric bicycle.

Electric bicycle wheels with drive units to support driver torque generated by a driver by means of motor force are known. Motor support is usually only provided if the driver himself applies a certain driver torque, that is to say only during pedal actuation by the driver. If the driver stops the pedal actuation, it is provided or, for example, required by law that the generation of a supporting motor torque stops. Typically, the drive unit is then shut down. However, this often leads to undesirable reactions of the drive train. On the one hand, an undesirable noise generation of the drive unit or drive train can occur due to the shutdown. On the other hand, a short-term continuation of running of the drive unit can lead to a short counter-rotating initiation of force on the pedal, which is noticeable at the foot of the driver by a so-called "kickback". This occurs especially clearly when the drive unit cannot drive the drive train without pedal movement (no use of a so-called driver freewheeling).

SUMMARY

By contrast, the method according to the disclosure having the features of claim 1 is characterized in that undesirable noise generation and a kickback of a drive unit of an electric bicycle can be significantly reduced or completely prevented. This is achieved by a method comprising: (i) determining a temporary actual torque curve of a driver torque generated by a driver of the electric bicycle, in particular during an operation of the electric bicycle, by means of muscle force, (ii) estimating a future torque curve by extrapolating the determined actual torque curve, (iii) determining whether the estimated future torque curve falls below a predetermined first torque threshold within a predetermined first time frame, and (iv) controlled reduction of a motor torque generated by means of the drive unit when the estimated future torque curve within the first time frame falls below the first torque threshold.

In other words, in the method, detection, in particular by recording, of the actual torque curve of the driver torque is carried out. That is to say, the temporary actual torque curve preferably describes a torque curve in the past up to an instantaneous value of the torque at the instantaneous time. The actual torque curve is determined by means of a torque sensor, for example.

Based on this detected actual torque curve, an extrapolation is used in order to estimate what the torque curve of the driver torque will look like in the future. In particular, the future torque curve determined in this way describes a temporary torque curve starting from the instantaneous time into the future, preferably at least for a predetermined time frame, for example at least 5 ms, preferably up to several seconds, for example up to 10 seconds.

Then, it is analyzed whether the estimated future torque curve falls below the predetermined first torque threshold within the predetermined first time frame. If such a shortfall is determined, the controlled reduction of the motor torque is subsequently carried out, preferably immediately in response to this determination.

If the estimated future torque curve does not fall below the first torque threshold within the first time frame, a normal operation of the drive unit can preferably be continued unimpeded.

The method thus offers the advantage that stopping the pedal actuation of the driver or falling below the pedal actuation from a certain lower torque limit can be detected in advance before its occurrence. By controlling the drive unit as a function of this estimated future mode of operation, the reduction of the motor torque can in particular be prepared with a certain reserve of time, such that, for example, by stopping the drive unit less abruptly, a kickback and/or noise can be significantly reduced or completely suppressed. As a result, a particularly comfortable operation can be provided for the driver, because, for example, the driver request can be implemented particularly reliably and precisely and without unexpected reactions of the drive train.

Preferably, the determination of the temporary actual torque curve takes place at discrete times, which lie in particular at predetermined intervals to one another. For example, a measurement sample for the driver torque can always be acquired at a distance of 1 ms or for several milliseconds. Preferably, at least the two most recently acquired measurement samples are considered to be the determined actual torque curve. That is to say, extrapolation can be done based at least on the two last detected driver torque samples. Thus, a particularly easy-to-implement carrying out of the method can be enabled.

Preferably, the predetermined first torque threshold is at least −2 Nm, preferably a maximum of 5 Nm, particularly preferably 2 Nm.

In particular, the method is carried out during operation of the drive unit of the electric bicycle. Further preferably, the method is carried out only when the driver of the bicycle applies at least one predetermined driver torque, that is to say only while the driver is actively pedaling.

Preferred further developments of the disclosure are also set forth below.

Preferably, the controlled reduction of motor torque comprises the following step: reducing the motor torque to a predetermined torque value within a predetermined second time frame. Preferably, the predetermined torque value is 0 Nm. This ensures that the operation of the drive unit is reliably reduced or restricted in a precisely determined manner if the driver torque is detected to be less than the first torque threshold.

Preferably, the second time frame is a predetermined minimum time frame greater than zero seconds. That is to say, the second time frame is greater than zero seconds, which in particular means that the motor torque is not abruptly, but rather gradually, reduced. Thus, the kickback of the drive unit and the noise generation can be particularly reliably significantly reduced or completely prevented.

More preferably, the second time frame is less than the first time frame. That is to say, the motor torque is reduced to the predetermined torque value even before falling below the first torque threshold through the future torque curve. This ensures that the motor torque is already sufficiently reduced before being extrapolated below the first torque threshold.

Preferably, the second time frame is at least 2 ms, preferably at least 5 ms, in particular a maximum of 100 ms.

Thus, it can be ensured that a sufficiently slow and sufficiently fast reduction of the motor torque is carried out simultaneously.

Further preferably, the controlled reduction of the motor torque is carried out with a predetermined reduction gradient. A predetermined ratio of an amount of an overall reduction to an amount of time within which this overall reduction is carried out is considered to be the reduction gradient. In other words, the reduction gradient corresponds to a slope of a temporary motor torque curve. In particular, the reduction gradient is negative. Preferably, the reduction gradient can be constant for a particularly simple implementation of the method. Alternatively, the reduction gradient is variable, in particular such that, at the start of the controlled reduction, a very large amount of the reduction gradient, i.e. a rapid or strong reduction of the motor torque, is present, wherein the amount of the reduction gradient is significantly smaller when approximating the predetermined torque value to be achieved, i.e. a slower or weaker reduction torque occurs. This can in particular reliably prevent noise generation or a kickback of the drive unit due to the torque reduction, because a gentle shutdown of the drive unit is enabled, and thus, for example, a gentle braking of a rotor of an electric motor of the drive unit.

Preferably, the method further comprises: (i) determining a third time frame, which is defined as a time, in particular starting from the instantaneous time, until falling below the first torque threshold by the estimated future torque curve, and (ii) adjusting the second time frame and/or the reduction gradient as a function of the determined third time frame. In other words, the second time frame and/or the reduction gradient is variably adjusted as a function of the time until the estimated future torque curve falls below the first torque threshold. That is to say, for example, if a small third time frame is determined, a very sharp reduction in motor torque will occur in a short time. An increase of the second time frame and/or the reduction gradient can occur analogously at a greater third time frame. Thus, if the sufficiently fast reduction is ensured with particularly reliable assurance, a particularly smooth shutdown of the drive unit can be made possible with slower deceleration of the pedal actuation.

Particularly preferably, controlled reduction of motor torque comprises: (i) first reduction of the motor torque in a first partial time frame of the second time frame with a first reduction gradient, and (ii) second reduction of the motor torque in a second partial time frame of the second time frame with a second reduction gradient. The second partial time frame is temporally, in particular immediately, after the first partial time frame. Further, an amount of the second reduction gradient is less than an amount of the first reduction gradient. Preferably, the first partial time frame and the second partial time frame are defined in a predetermined fixed relationship to one another. Alternatively, the ratio can be adjusted as a function of the entire second time frame. Thus, a substantially two-stage reduction of the motor torque occurs, first with a large amount of the reduction gradient and then with a smaller amount of the reduction gradient. As a result, an optimal drive unit shutdown operation of the drive unit can be provided in a simple and reliable manner, which can reliably prevent a kickback and a noise generation.

Preferably, the controlled reduction of the motor torque is carried out in the form of an exponential reduction. As a result, a functional relationship can be implemented in a particularly straightforward manner, which allows for a sharp reduction per time at the start of the controlled reduction, and later for a slow abatement of the reduction.

Preferably, the method further comprises the following steps: (i) comparing an instantaneous value of the driver torque to a predetermined second torque threshold, and (ii) shutting down the drive unit when the determined instantaneous value is less than or equal to the second torque threshold.

In particular, the shutdown occurs immediately. Preferably, a reduction of the motor torque by 100% is considered to be a shutdown. Thus, for example, an additional shutdown criterion can be provided in order to reliably shut down the drive unit, for example if this is required due to a very low driver torque.

Particularly preferably, the second torque threshold is less than the first torque threshold. In particular, the second torque threshold is a maximum of 0 Nm, preferably a maximum of −5 Nm, particularly preferably a maximum of −10 Nm.

Preferably, the method further comprises the following steps: (i) recording the temporary actual torque curve of the driver torque during an operation of the electric bicycle, and (ii) adjusting at least one threshold and/or at least one time frame by means of machine-learning based on the recorded actual torque curve.

Preferably, an evaluation is carried out as to whether the recorded torque curve was subsequently accompanied by a stopping of the pedaling of the driver, wherein the adjustment is advantageously carried out based on this information. In other words, the actual torque curve of the driver torque is monitored and recorded over a longer period of operation of the electric bicycle, and the threshold and/or the time frame is adjusted by means of self-learning based on an analysis of this recorded actual torque curve, for example by means of a control unit. Particularly preferably, the first torque threshold and/or the second torque threshold and/or the first time frame and/or the second time frame are adjusted in a self-learning manner. Particularly preferably, additionally or alternatively, the first reduction gradient and/or the second reduction gradient and/or the first partial time frame and/or the second partial time frame can be adjusted in a self-learning manner. As a result, an optimization of the predetermined thresholds and/or time frames can be carried out in order to allow the performance of the method to be particularly reliable, precise, and highly comfortable for the driver. In this respect, it can be provided in particular that it will always be discernible subsequently for the learning algorithm whether the driver actually wished to stop pedaling or whether the driver wished to continue pedaling. This subsequent information can be used in order to adjust future thresholds accordingly.

Further preferably, the extrapolation is carried out by means of polynomial approximation, in particular by means of linear approximation, of the determined temporary actual torque curve. That is to say a function, for example a virtual function, is determined that enables a forecast of the future curve based on the determined actual torque curve. In particular, the actual torque curve is determined as a mathematical function. The polynomial approximation is determined based in particular on a first derivative of this mathematical function. In particular, a straight line that has the instantaneous slope of the actual torque curve is considered a linear approximation. Thus, a precise estimation of the future torque curve can be easily enabled for a sufficiently long time frame.

Further, the disclosure results in an electric bicycle comprising a drive unit and a control unit. The control unit is configured so as to operate the drive unit in a controlled manner. Furthermore, the control unit is configured so as to carry out the described method.

Preferably, the electric bicycle comprises a chainwheel and a crank assembly. The chainwheel and crank assembly are mechanically rigidly connected to one another, in particular without free-wheeling. In the case of an electric bicycle without freewheeling between the chainwheel and crank assembly, the method according to the disclosure has a particularly advantageous effect on optimum driving comfort, because a kickback and/or noise generation when switching off the drive unit on a freewheel-free electric bicycle can be in particular clearly demonstrated.

BRIEF DESCRIPTION OF THE DRAWINGS

Embodiment examples of the disclosure are described in detail below with reference to the accompanying drawing. The drawing shows.

DETAILED DESCRIPTION

Figure 1:
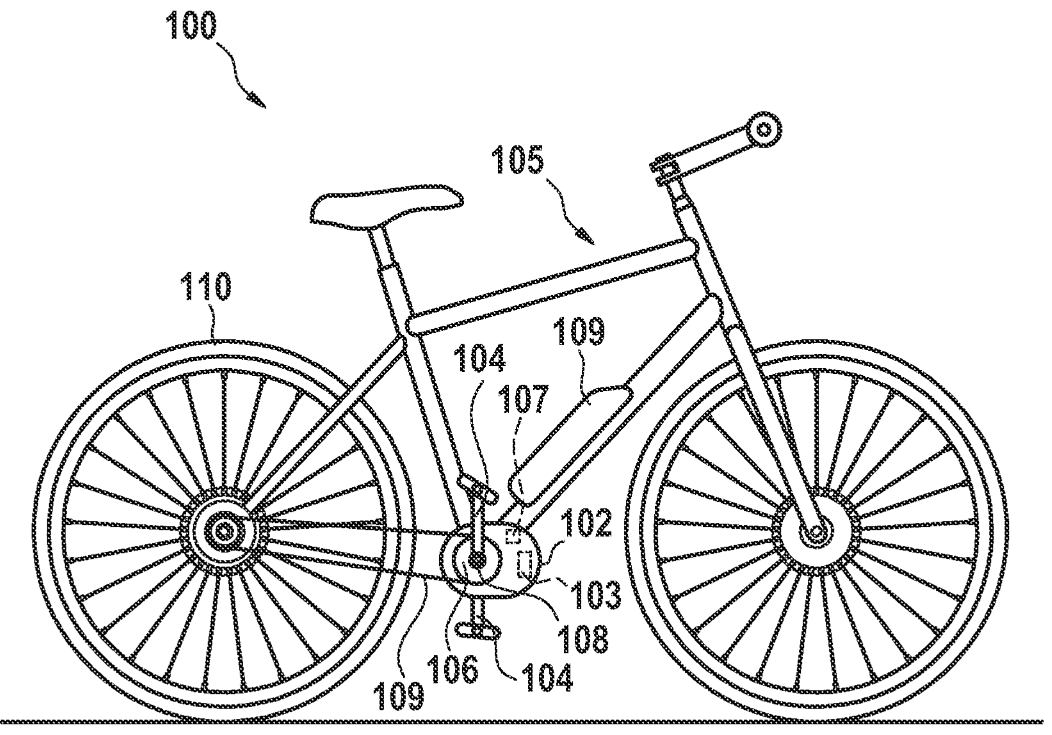
FIG. 1 a simplified schematic view of an electric bicycle in which a method for operating the electric bicycle according to a preferred embodiment example of the disclosure is carried out, FIG. 2 a simplified view of a temporary torque curve, which is determined in the method, FIG. 3 a simplified view of an alternative temporary torque curve determined in the method, and FIG. 4 a simplified view of a temporary motor torque curve that can be provided by the method.

FIG. 1 shows a simplified schematic view of an electric bicycle 100. The electric bicycle 100 comprises a drive unit 102 configured as an electric motor. The drive unit 102 is arranged in the region of a crankset 108 of the electric bicycle 100 and is provided to assist a manual pedaling force of a driver of the electric bicycle 100 applied via a crank assembly 104 through an electromotorically generated motor torque.

Further, the electric bicycle 100 comprises an electrical energy accumulator 109 by means of which the drive unit 102 is supplied with electrical energy.

The drive unit 102 also comprises a control unit 103.

The crank assembly 104 of the electric bicycle 100 is rigidly connected, that is to say, rotationally fixed, in particular without freewheeling, to a chainwheel 106. By means of the chainwheel 106, a bicycle chain 109 is driven, via which a rear wheel 110 of the electric bicycle 100 is driven. The drive unit 102 is mechanically coupled to the chainwheel 106 in order to apply the motor torque to the chainwheel 106 in addition to the driver torque.

The control unit 103 is configured so as to operate the drive unit 102 as a function of a pedal actuation of a driver of the electric bicycle 100. In detail, the drive unit 102 is controlled such that, as function of a motor torque generated by means of muscle force of the drive, the motor torque is generated in order to motor-assist the driver in pedaling. It is provided that the motor torque is generated only during pedal actuation at a predetermined minimum driver torque. That is to say, if the driver stops pedaling or if the driver torque falls below the minimum driver torque, the operation of the drive unit 102 must also stop.

The control unit 103 is configured so as to carry out a method for operating the drive unit 102 according to a preferred embodiment example of the disclosure. By means of the method, an optimized shutdown of engine power support by the drive unit 102 can be provided by the driver when pedaling is stopped during driving, in particular during forward motion of the electric bicycle 100. Here, reducing the motor torque of the drive unit 102 can be carried out such that a kickback as well as noise generation can be significantly reduced or entirely prevented.

The process of the method will be described in detail below with respect to FIGS. 2 to 4.

Figure 2:
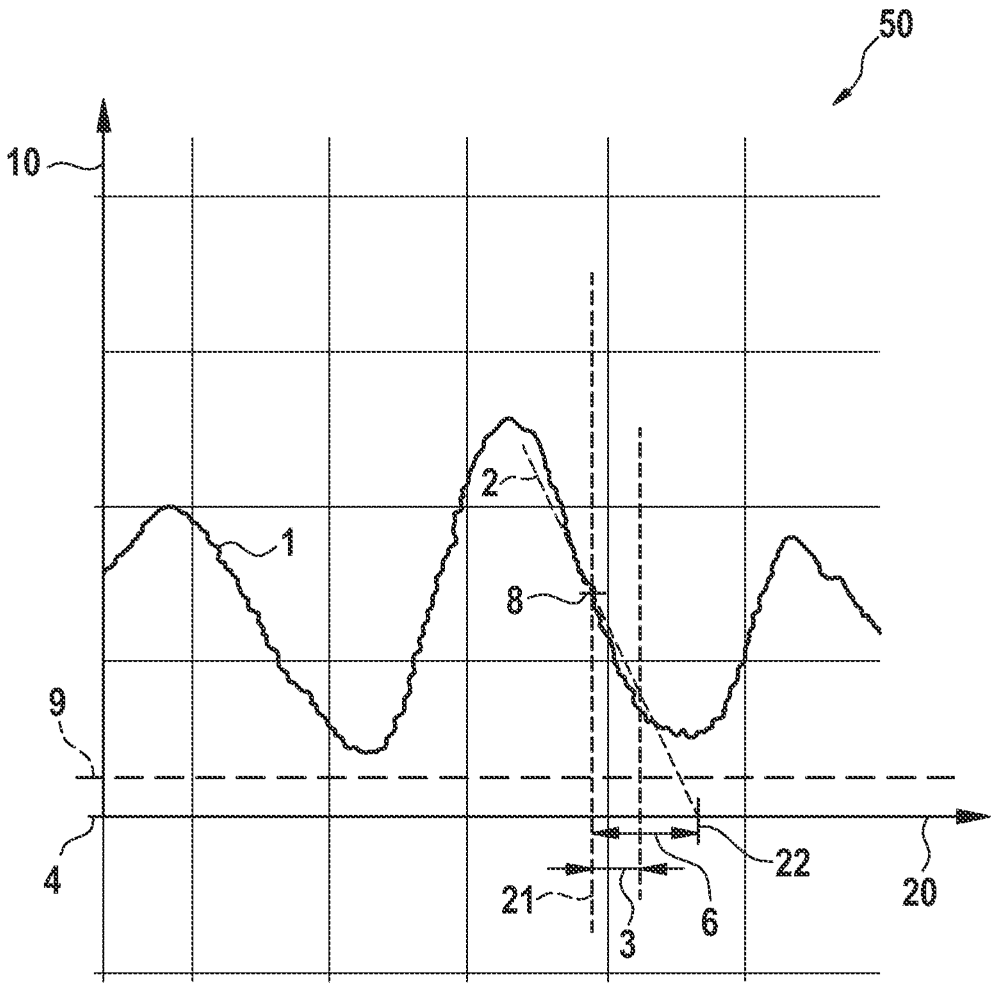
Figure 3:
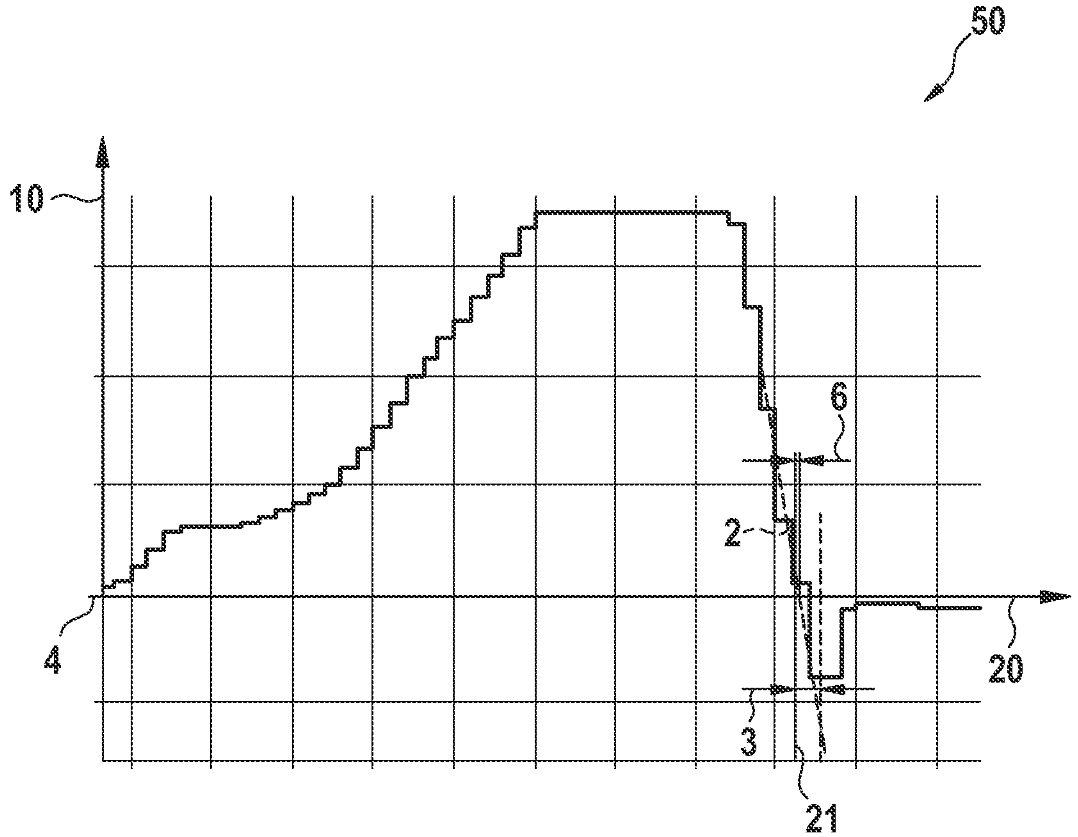

FIG. 2 shows an exemplary view of a torque recording 50 that can be captured while driving the electric bicycle 100. The driver torque 10 is shown as a function of time 20. The driver torque 10 can be detected using a torque sensor 107 (see FIG. 1). Thus, in the torque recording 50 of FIG. 2, an exemplary temporary actual torque curve 1 of the driver torque 10 is shown.

As can be seen in FIG. 2, the current value of the driver torque 10 changes periodically over time 20, for example similar to a sinusoidal vibration.

In the method, by means of the control unit 103, a future torque curve 2 is estimated which the driver is expected to generate by means of his or her muscle force. The description of this estimation is made subsequently based on the instantaneous time 21 assumed in FIG. 2 as an example. For a better comprehensibility of the method, this instantaneous time 21 is centrally placed in an exemplary actual torque curve 1. During an actual performance of the method, at the instantaneous time 21, only the portion of the actual torque curve 1 lying to the left of the dashed line 21 is known, for example by recording. The part of the curve 1 located to the right of the dashed line 21 would thus lie in the future.

In the method, the future torque curve 2 is estimated by extrapolating the determined actual torque curve 1 from the instantaneous time 21. The extrapolation is carried out by linear approximation of the determined temporary actual torque curve 1. In detail, a gradient of the actual torque curve 1 is determined at the instantaneous time 21. This results in the future torque curve 2 as a straight line with the slope of the actual torque curve 1 at the time 21.

For example, the determination of the actual torque curve 1 can be accomplished by detecting instantaneous values for the driver torque 10 during driving of the electric bicycle 100 at respective discrete times. In this case, the extrapolation by linear approximation can be done by determining the gradient based on the two most recently detected values of the driver torque 10 and their time interval. The future torque curve 2 can thus be estimated in a particularly straightforward manner.

Based on the estimated future torque curve 2, it is subsequently determined whether this estimated future torque curve 2 falls below a predetermined first torque threshold 4 within a predetermined first time frame 3 starting from the instantaneous time 21.

For example, the first torque threshold 4 can be set as 0 Nm, alternatively preferably as a low torque value, for example 2 Nm.

If the first torque threshold 4 is not fallen below within the first time frame 3, as is the case in the torque recording 50 of FIG. 2, it can be determined, for example, that the driver wishes to continue pedaling. In this case, the controlled actuation of the drive unit 102 can be continued in normal operation.

For example, the determination of whether the estimated future torque curve 2 within the first time frame 3 falls below the first torque threshold 4 can be accomplished in that a third time frame 6 is determined, which defines a time until the time 22 of falling below the first torque threshold 4 by the estimated future torque curve 2 starting from the instantaneous time 21. This third time frame 6 is then compared to the first time frame 3. If the third time frame 6 is greater than the first time frame 3, no undershot is detected.

Another case in which the estimated future torque curve 2 within the first time frame 3 falls below the first torque threshold 4 is shown by way of example in FIG. 3. In this case, the third time frame 6 is less than the first time frame 3.

If the case depicted in FIG. 3 occurs, i.e. the estimated future torque curve 2 within the first time frame 3 falls below the first torque threshold 4, the method by means of the control unit 103 causes a controlled reduction of the motor torque generated by means of the drive unit 102.

The performance of the controlled reduction of the motor torque is described below with respect to FIG. 4. FIG. 4 shows a motor torque recording 59 during the performance of the method and in the event that the torque recording 50 shown in FIG. 3 is present. In FIG. 4, the motor torque 5 is shown as a function of the time 20.

Figure 4:
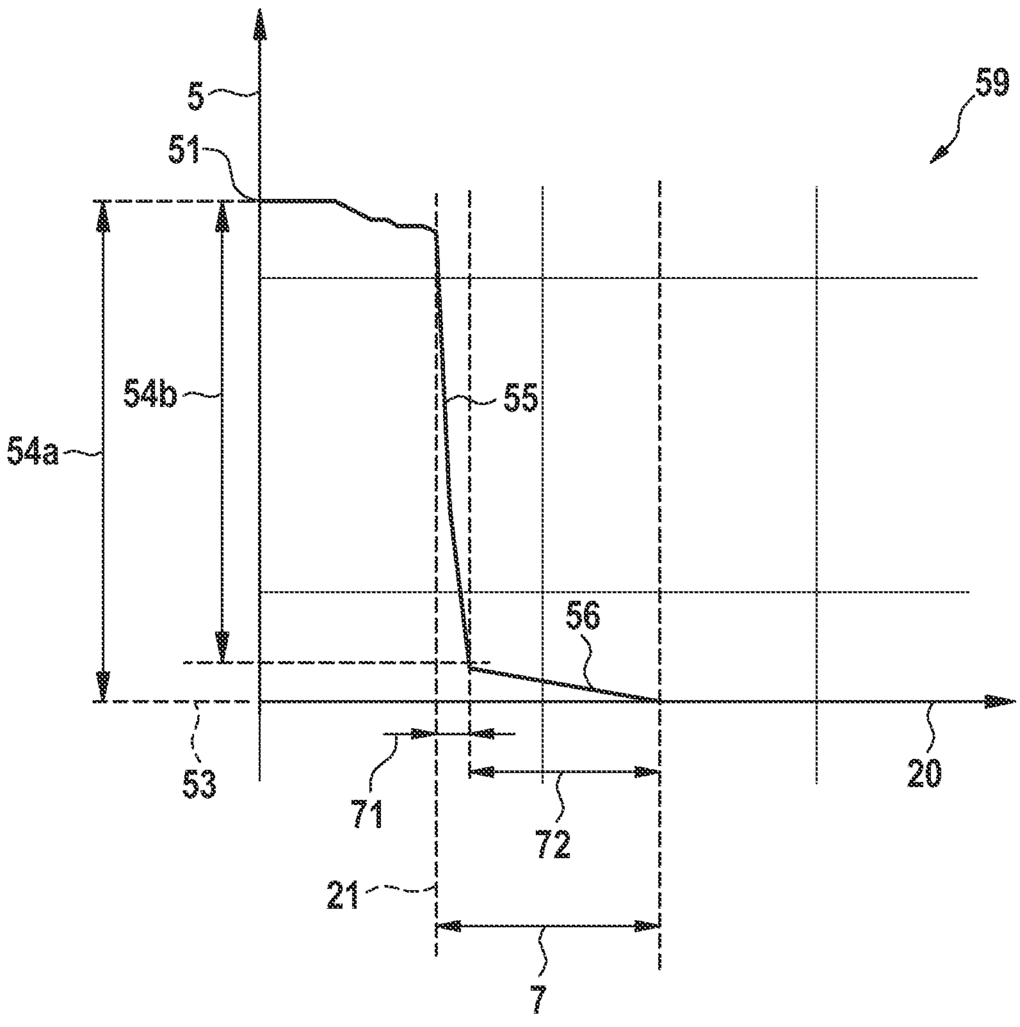

FIG. 4 shows the reduction of the motor torque 5 in response to the determination shown in FIG. 3 that the estimated future torque curve 2 within the first time frame 3 falls below the first torque threshold 4. As shown in FIG. 4, at the instantaneous time 21 (corresponding to the time 21 of FIG. 3), the controlled reduction is started from an instantaneous torque 51.

The reduction of the motor torque 5 is carried out such that the motor torque 5 occurs from the instantaneous torque 51 within a predetermined second time frame 7 until a predetermined torque value 53, which is preferably 0 Nm. In this case, the reduction of the motor torque 5 is carried out in two phases: a first reduction initially takes place in a first partial time frame 71 of the second time frame 7 with a first reduction gradient 55. Immediately after the first reducing, a second reduction of the motor torque 5 occurs in a second partial time frame 72 of the second time frame 7 with a second reduction gradient 56. In particular, a sum of the first partial time frame 71 and the second partial time frame 72 thus corresponds to the second period 7.

The first reduction gradient 55 and the second reduction gradient 56 as well as the first partial time frame 71 and the second partial time frame 72 are configured such that, immediately at the start of the controlled reduction, a very strong torque reduction takes place in a short time and subsequently a more gentle abatement of the torque reduction until the torque value 53. In particular, in both partial time frames 71, 72, an exponential reduction of the motor torque 5 takes place.

Preferably, the first partial time frame 71 corresponds to a maximum of 20%, particularly preferably a maximum of 10%, of the entire second time frame 7. Further preferably, the motor torque 5 is reduced within the first partial time frame 71 by a predetermined first reduction amount 54*b*, which is at least 80%, preferably at least 90%, of a total reduction amount 54*a*. In particular, the total reduction amount 54*a* corresponds to a difference between the instantaneous motor torque 51 and the predetermined torque value 53.

In a preferred further development of the disclosure, the time frames and/or thresholds and/or reduction gradients are variably adjustable via the control unit 103. It is particularly advantageous for one or more of these parameters to occur as a function of the third time frame 6. Because this third time frame 6 defines the estimated time until the first torque threshold 4 is reached by the estimated future torque curve 2, the operation of the torque reduction of the drive unit 102 can thereby be particularly flexible and optimally adjusted to the instantaneous travel operation. For example, the second time frame 7 can be increased if a larger third time frame 6 has been determined. Furthermore, for example, the first reduction gradient 55 and/or the second reduction gradient 56 can be decreased in terms of amount if a greater third time frame 6 has been determined. Thus, for example, at a greater third time frame 6, a particularly smooth shutdown of the drive unit 102 can be carried out in order to particularly reliably reduce kickback and undesirable noise generation.

Furthermore, the method can comprise additional monitoring of the instantaneous value 8 of the driver torque 10 (compare FIG. 2), wherein the instantaneous value 8 is compared to a predetermined second torque threshold 9. For example, the second torque threshold 9 can be slightly above the first torque threshold 4 (compare FIG. 2).

In the method, if the instantaneous value 8 of the driver torque 10 reaches or falls below the second torque threshold 9, the drive unit 102 is switched off immediately, i.e. an immediate torque reduction to the value 0 Nm is caused. This can ensure that, if an impending stopping of pedaling of the operator occurs, it is reliably prevented that, at the actual time of the stopping, the drive unit 102 will no longer generate motor torque.

It is also particularly advantageous when the control unit 103 is configured so as to adjust, i.e. optimize, in a self-learning manner the time ranges and/or thresholds and/or reduction gradients by way of machine-learning. This can be done based on a recorded actual torque curve 1, which is recorded for an extended time frame during driving of the electric bicycle 100. For example, the shutdown operation of the drive unit 102 provided by the method can thereby be particularly closely matched to an individual driving style of the operator of the electric bicycle 100 when a pedaling stop is impending, in order to provide a high precision of the method and the highest possible driving comfort.

What is claimed is:

1. A method for operating a drive unit of an electric bicycle, comprising:

determining an actual torque curve of a driver torque generated by a muscle force of a driver of the electric bicycle;

estimating a future torque curve by extrapolating the determined actual torque curve;

determining whether the estimated future torque curve falls below a predetermined first torque threshold within a predetermined first time frame; and reducing, in a controlled manner, a motor torque generated by way of the drive unit in response to the estimated future torque curve within the first time frame falling below the first torque threshold.

2. The method according to claim 1, wherein the reducing, in the controlled manner, of the motor torque comprises reducing the motor torque to a predetermined torque value within a predetermined second time frame.

3. The method according to claim 2, wherein the second time frame is a predetermined minimum time frame greater than zero seconds.

4. The method according to claim 2, wherein the second time frame is less than the first time frame.

5. The method according to claim 2, wherein the second time frame is at least 2 ms.

6. The method according to claim 2, wherein the reducing, in the controlled manner, of the motor torque is carried out with a predetermined reduction gradient.

7. The method according to claim 6, further comprising:

determining a third time frame as a time until falling below the first torque threshold by the estimated future torque curve; and adjusting the second time frame and/or the reduction gradient as a function of the determined third time frame.

8. The method according to claim 6, wherein the controlled reduction of the motor torque comprises:

first reduction of the motor torque in a first partial time frame of the second time frame with a first reduction gradient; and second reduction of the motor torque in a second partial time frame of the second time frame with a second reduction gradient, wherein the second partial time frame is after the first partial time frame, and wherein an amount of the second reduction gradient is less than an amount of the first reduction gradient.

9. The method according to claim 2, wherein the second time frame is at least 5 ms.

10. The method according to claim 2, wherein the second time frame is a maximum of 100 ms.

11. The method according to claim 1, wherein the reducing, in the controlled manner, of the motor torque is carried out as an exponential reduction.

12. The method according to claim 1, further comprising:

comparing an instantaneous value of the driver torque to a predetermined second torque threshold; and shutting down the drive unit when the instantaneous value is less than or equal to the second torque threshold.

13. The method according to claim 12, wherein the second torque threshold is less than the first torque threshold.

14. The method according to claim 1, further comprising:

recording the actual torque curve of the driver torque during an operation of the electric bicycle; and adjusting at least one threshold and/or at least one time frame by way of machine-learning based on the recorded actual torque curve.

15. The method according to claim 1, wherein the extrapolation is carried out by way of polynomial approximation of the determined actual torque curve.

16. The method according to claim 1, wherein the reducing, in the controlled manner, of the motor torque comprises reducing the motor torque to zero within a predetermined second time frame.

17. The method according to claim 1, wherein the extrapolation is carried out by way of linear approximation of the determined actual torque curve.

18. An electric bicycle, comprising:

a drive unit; and a control unit configured to actuate the drive unit, wherein the control unit is further configured to;

determine an actual torque curve of a driver torque generated by a muscle force of a driver of the electric bicycle;

estimate a future torque curve by extrapolating the determined actual torque curve;

determine whether the estimated future torque curve falls below a predetermined first torque threshold within a predetermined first time frame; and reduce, in a controlled manner, a motor torque generated by way of the drive unit in response to the estimated future torque curve within the first time frame falling below the first torque threshold.

19. The electric bicycle according to claim 18, further comprising:

a chainwheel; and a crank assembly, wherein the chainwheel and crank assembly are rigidly connected to one another.

* * * * *